Sept. 12, 1961 W. J. COMPAS 2,999,307
FABRICATION OF HOLLOW ARTICLES
Filed Nov. 30, 1956
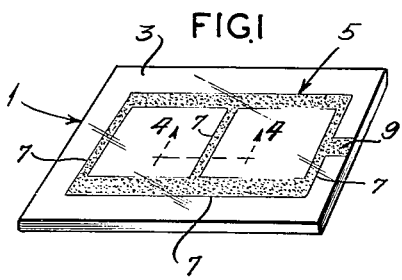
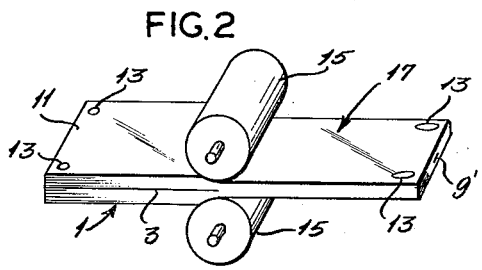
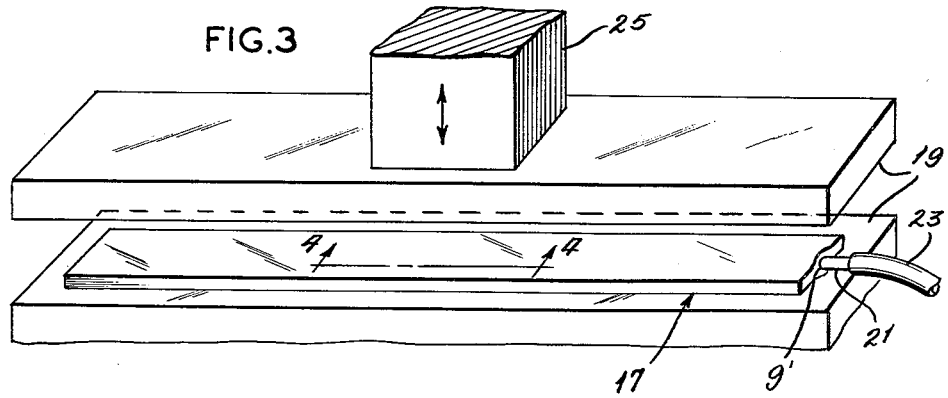
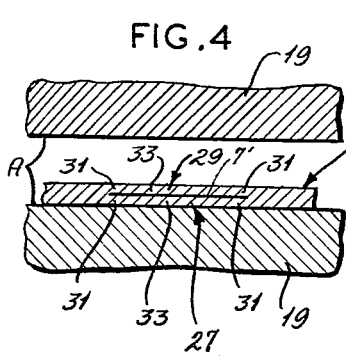
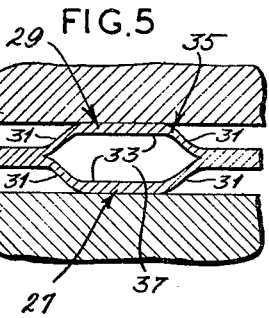
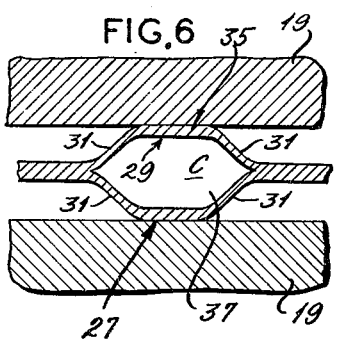
INVENTOR:
WILLIAM J. COMPAS
By Lionel E. Goff & Robert F. Ruemeli
ATTORNEYS.

United States Patent Office 2,999,307
Patented Sept. 12, 1961

2,999,307
FABRICATION OF HOLLOW ARTICLES
William J. Compas, Branford, Conn., assignor to Olin Mathieson Chemical Corporation, East Alton, Ill., a corporation of Virginia
Filed Nov. 30, 1956, Ser. No. 625,534
6 Claims. (Cl. 29—157.3)

This invention relates to the fabrication of hollow articles and more particularly to forming the hollows in such articles.

In a process for fabricating hollow expanded sheet metal artciles fully described in U.S. Patent No. 2,690,-002, granted September 28, 1954, a pattern of weld-inhibiting material is applied to a clean surface of a sheet of metal and a clean surface of a second sheet of metal is superimposed on the first surface to which the pattern has been applied. The superimposed sheets are then tacked together as by spot welding to prevent relative slippage and the sheets are then welded together in their adjacent areas not separated by the weld-inhibiting pattern, in any appropriate manner as by hot rolling, to form a blank. During the rolling operation the sheets are elongated in the direction of rolling and it is therefore necessary to foreshorten the pattern of weld-inhibiting material in the intended direction of rolling. An opening is then formed into the unjoined portion of the blank defined by the weld-inhibiting material, and a fluid pressure is injected therein to outwardly expand the blank and form a hollow panel. The pattern of weld-inhibiting material may assume any desired configuration. For example, the pattern may be such as to define a fluid conveying refrigerator evaporator circuit after expansion of the blank.

In many hollow articles, such as refrigerator evaporators, having expanded fluid conveying facilities, it is often desirable to provide as great a fluid capacity as possible. This may be accomplished either by providing wider hollow spaces, or by expanding the walls of the hollow outwardly to a greater extent. Because of a complicated design, or because of limitations inherent in the operating environment of the finished article, it is often impractical to increase the width of the hollow portion. On the other hand, the amount which the walls of the hollow portion may be outwardly distended is limited because of the possibility of rupturing the walls. As the walls are outwardly distended, they invariably neck-down in the area immediately adjacent the solid or web portion of the expanded article and maintain substantially the same thickness as they had prior to expansion in the central area of the expanded wall, or in other words, the area which has been distended outwardly the farthest. The aforementioned patent discloses expanding blanks of this type either by injecting a fluid pressure into the unjoined portion of the blank and permitting the walls to distend outwardly without external restraint of any sort, or alternately, by restraining expansion of the blank between dies having cut-out configurations coinciding with the configuration of the unjoined portion of the blank thereby shaping the distended walls in conformity with the shape of the cut-out portions in the die. Alternatively the blanks were expanded between spaced apart rigid restraining pads by applying a pressure above the rupture strength of the panel when unrestrained. Even when a blank is inflated between spaced apart rigid restraining pads and the amount of outward distention of the walls is limited by the spacing of the pads, the walls will rupture adjacent the solid or web portion of the finished article if they are distended outwardly too far, or if the fluid pressure injected into the unjoined portion of the blank is too high.

This invention is directed to further increasing the volume of such a hollow portion by first expanding the blank between spaced apart rigid restraining pads at a relatively high pressure, then relieving the pressure and spacing the pads apart a greater amount, and then injecting a lower pressure into the hollow portion to again expand the walls into firm engagement with the pads, thereby producing a greater volume without rupturing the walls than is obtained in outwardly distending the walls the ultimately desired amount in a single expansion step. It has been found that in attempting to obtain the desired expansion in a single step, sufficient pressure could not be exerted within the hollow portion without rupturing the walls to produce the volume obtained by multiple stage expansion.

It is therefore an object of this invention to provide an improved hollow article.

Another object of this invention is to increase the volume within the hollow portion of an article fabricated substantially as set forth in the aforementioned U.S. Patent No. 2,690,002.

Another object of this invention is to obtain an increased volume in the hollow portion of an article of the aforementioned type without substantially weakening or rupturing the article.

Still another object is to provide a novel method for inflating and expanding a hollow article.

Additional objects and advantages will be apparent from the follow description and drawings illustrating an embodiment of the invention in which:

FIGURE 1 illustrates a sheet of metal with a pattern of weld-inhibiting material applied to a clean surface thereof;

FIGURE 2 schematically illustrates the sheet of metal shown in FIGURE 1 with a second sheet of metal superimposed thereon and tacked thereto as by spot welding, with the pattern of weld-inhibiting material sandwiched between the sheets and showing the resultant pack being welded together in a rolling mill to form a blank;

FIGURE 3 schematically illustrates the resultant blank shown in FIGURE 2, positioned between a pair of spaced apart rigid restraining pads, and with a fluid pressure supply line connected to the blank;

FIGURE 4 is a schematic sectional view taken on the line 4—4 in FIGURE 3 and showing the weld-inhibiting pattern indicated by the dotted line 4—4 in FIGURE 1;

FIGURE 5 is a schematic sectional view similar to FIGURE 4 but showing the blank after a fluid pressure has been injected into the unjoined portion thereof to distend the walls defining the unjoined portion into firm engagement with the rigid restraining pads; and FIGURE 6 is a schematic sectional view similar to FIGURE 5 but showing the rigid restraining pads spaced apart a greater amount than in FIGURES 3 through 5, and with the walls of the hollow portion again distended outwardly by a fluid pressure into firm engagement with the pads.

Referring to FIGURE 1, a sheet of metal 1 has applied to a clean surface 3 a pattern of weld-inhibiting material 5. The pattern may assume any desired configuration and as here illustrated, includes a plurality of interconnected longitudinal and transverse tubes 7 and an inlet portion 9 interconnecting one of the tubes and an edge of the sheet.

FIGURE 2 shows the sheet 1 with a second sheet 11 superimposed on the surface 3 of the first sheet with the pattern of weld-inhibiting material sandwiched between the sheets 1 and 11. The sheets are tacked together as by spot welding 13 to prevent relative slippage between the sheets as they pass through a pair of mill rolls 15. The mill rolls reduce the thickness of the pack of sheets and elongate the sheets in the direction of rolling while welding the sheets together in their adjacent areas not separated by the weld-inhibiting pattern. It is normally necessary to heat the pack of sheets prior to passing them through the rolling mill in order to effect an adequate weld, but whether or not this is necessary depends on the inherent characteristics of the metal being welded. Because of the elongation of the sheets in passing through the rolling mill, the pattern of weld-inhibiting material 5 must be foreshortened in the intended direction of rolling and for this reason the transverse lines of weld-inhibiting material are much narrower than the longitudinal lines. After rolling, these lines of weld-inhibiting material form unjoined portions all of substantially the same width within the blank.

In FIGURE 3 the resultant blank 17 of FIGURE 1 has been positioned between spaced apart rigid restraining pads 19. The inlet 9' is pried open in any conventional manner and a nozzle 21 is secured therein. A hose 23 interconnects the nozzle with a source of high pressure fluid. Normally the lower pad 19 is fixed and the upper pad 19 is adjustable toward and away from the lower pad. Such adjustments may be accomplished in any conventional manner as by a hydraulic piston or a gear and rack operatively attached to the arm 25 on the top surface of the upper pad 19.

FIGURE 4 illustrates in section a portion of the assembly shown in FIGURE 3 and shows one of the unjoined strips 7' in the blank 17. This portion of the blank is indicated by the dashed section line 4—4 in FIGURE 1. The unjoined area 7' of the strip is defined by a lower wall 27 and an upper wall 29.

As a fluid pressure is introduced through the nozzle 21 into the unjoined portion of the blank 17, the walls 27 and 29 are distended outwardly and into engagement with the pads 19, as shown in FIGURE 5. Sufficient pressure is applied to provide as great a volume as may be obtained without danger of unduly stretching the metal in the walls 27 and 29 in the areas 31 adjacent the web of the panel. The walls will maintain substantially the same thickness in the areas 33 as they had prior to outward distention of the walls.

The fluid pressure within the resultant hollow article 35 is now released and the pads 19 are spaced apart a greater amount as illustrated in FIGURE 6. Fluid pressure is again injected into the hollow portion 37 of the article 35 and the walls 27 and 29 are again expanded into firm engagement with the pads 19. The pressure may again be raised to distend the walls outwardly to produce the greatest possible volume without unduly weakening or rupturing the walls in the areas 31.

The resultant volume obtained in hollow portion 37 of the article 35 by expanding the blank 17 in the aforementioned manner is substantially greater than the volume which is obtained by expanding the walls 27 and 29 to the same total outward distention indicated in FIGURE 6 in a single application of fluid pressure.

By way of further illustration the following table indicates the results obtained in expanding blanks in a single and in a two step operation. The blanks were fully annealed 2S or 1100 aluminum, .060 inch thick after rolling and prior to expansion. The following chart illustrates the results for two different patterns of weld-inhibiting material as indicated by the transverse line in the center of the chart.

| Expansion Stages | (A) Initial Spacing Between Pads 19, In Inches (FIGURES 3–5) | Initial Expansion Pressure in p.s.i. | (B) Final Spacing Between Pads 19, In Inches (FIGURE 6) | Final Expansion Pressure in p.s.i. | (C) Final Hollow Transverse Area for Weld-Inhibiting Strip ⅜ Inch Wide, in Square Inches (FIGURES 5 or 6) | Bursting Pressure in p.s.i. |
|---|---|---|---|---|---|---|
| 1. One | .180 | 3,000 | | | .034 | 740 |
| 2. One | .218 | 1,500 | | | .036 | 775 |
| 3. One | .218 | 1,700 | | | Burst | |
| 4. Two | .180 | 3,000 | .218 | 1,500 | .042 | 850 |
| 5. Two | .180 | 3,000 | .220 | 2,500 | .046 | 750 |
| 6. One | .180 | 3,000 | | | .034 | 925 |
| 7. One | .215 | 1,700 | | | .037 | 850 |
| 8. One | .215 | 1,800 | | | Burst | |
| 9. Two | .180 | 3,000 | .215 | 1,700 | .041 | 890 |
| 10. Two | .180 | 3,000 | .215 | 3,000 | .045 | 900 |

Referring to the first group of figures in Example 1, when a blank was expanded to .218 inch at a pressure of 1500 p.s.i. the cross-sectional area of a ⅜ inch wide tube was .036 square inch, whereas, as indicated in Example 4, when the same outward expansion was accomplished in two stages the cross-sectional area was .042 square inch, or an increase of approxiamtely 15%. Referring to Example 3, a similar tube burst when an attempt was made to expand the blank to .218 inch at 1700 p.s.i., in a single step. The "bursting pressure" is the pressure required to burst the hollow article when it is unrestrained as by the restraining pads. As is indicated in the chart, the "bursting pressure" for articles expanded in two stages was slightly higher than for articles expanded in one stage, indicating that a slightly greater increase in volume could have been obtained by applying a greater pressure during the two stage expansion. The results for expansion of the second type of hollow article show in Example 7, that when a blank was expanded to .215 inch at 1700 p.s.i., a ⅜ inch wide hollow portion has a cross-sectional area of .037 square inch, whereas, in Example 9, when a blank was expanded the same amount in two stages with a second expansion pressure of 1700 p.s.i., a similar hollow had a cross-sectional area of .041 square inch, or an increase of almost 11%. The bursting pressure for the panel expanded in two stages is again slightly higher than that expanded in a single stage indicating that the increase in the cross-sectional area of the hollow portion could have been slightly greater had the expansion pressure been increased slightly during the two stage expansion. The number of expansion stages may be increased past two and this would be particularly advantageous in expanding larger hollow portions.

This invention is directed primarily to hollow metal expanded panels fabricated in the manner of the aforementioned patent. However, it is equally applicable to the expansion of blanks fabricated by other methods as well as to blanks fabricated of other materials such as plastics or combination metal and plastic blanks.

Although this invention has been described with reference to certain embodiments, materials, and details, various changes will be apparent to one skilled in the art, and the invention is therefore not to be limited to such embodiments, materials, or details except as set forth in the appended claims.

I claim:
1. In forming a hollow article from a blank of ductile metal by expanding an unjoined portion of said blank, the method comprising the steps of expanding the unjoined portion of the blank into firm engagement with spaced apart pads by injecting a fluid pressure into said unjoined portion at a first pressure level sufficiently high to expand said unjoined portion, regulating said fluid pressure to below the bursting pressure level of said blank, and increasing the volume of the expanded unjoined portion by again expanding the resultant hollow portion into firm engagement with pads spaced farther apart than during said first expansion step by injecting a fluid pressure into said unjoined portion at a second pressure level between that sufficiently high to further expand said unjoined portion and said first pressure level.

2. In forming a hollow article from a blank of ductile metal by expanding an unjoined portion of said blank, the method comprising the steps of positioning the blank between spaced apart pads, expanding the unjoined portion of the blank into firm engagement with said pads by injecting a fluid pressure into said unjoined portion at a first pressure level to expand said unjoined portion, thereby forming a hollow portion, regulating said fluid pressure to below the bursting pressure level of said blank, increasing the spacing between said pads so that said pads are spaced farther apart than during the prior expansion step, and increasing the volume of the expanded unjoined portion by expanding the resultant hollow portion into firm engagement with the pads by injecting a fluid pressure into said unjoined portion at a second pressure level sufficiently high to further expand said unjoined portion, said second pressure level being below said first pressure level.

3. In forming a hollow article from a blank of ductile metal by expanding an unjoined portion of said blank, the method comprising the steps of expanding the unjoined portion of the blank into firm engagement with spaced apart pads by injecting into said unjoined portion a fluid pressure sufficiently high to rupture said blank when unrestrained between said pads, reducing said fluid pressure below the level sufficient to rupture said blank when unrestrained between said pads, and increasing the volume of the expanded unjoined portion by expanding the resultant hollow portion of said blank into firm engagement with pads spaced farther apart than during said first expansion by injecting into said unjoined portion a second fluid pressure below the rupturing pressure of said blank while confined between said pads spaced further apart.

4. In forming a hollow article from a blank of ductile metal by expanding an unjoined portion of said blank, the method comprising the steps of expanding the unjoined portion of the blank into firm engagement with spaced apart pads by injecting into said unjoined portion a fluid pressure sufficiently high to rupture said blank when unrestrained between said pads, said pads being spaced from each other at a distance less than the ultimate expansion desired in said unjoined portion, reducing said pressure below the level sufficient to rupture said blank when unrestrained between said pads, increasing the spacing between said pads so that said pads are spaced from each other at the points of ultimate expansion desired in said unjoined portion, and increasing the volume in the expanded unjoined portion by again injecting into said unjoined portion a fluid under pressure sufficient for expanding said unjoined portion into firm engagement with pads spaced apart at said increased spacing a greater distance than during the first expansion step, said increased volume being greater than that obtainable in the absence of said first expansion step.

5. In forming a hollow article from a blank of ductile metal by expanding an unjoined portion of said blank, the method comprising the steps of expanding the unjoined portion of the blank into firm engagement with spaced apart pads to form flat outer surfaces on the expanded unjoined portion of the blank through engagement of said outer surface with said pads by injecting into said unjoined portion a fluid pressure sufficiently high to rupture said blank when unrestrained between said pads, reducing said fluid pressure below the level sufficient to rupture said blank when unrestrained between said pads, and increasing the volume of the expanded unjoined portion by further expanding said unjoined portion into firm engagement with pads spaced apart a greater distance than during the first expansion step by injecting into said unjoined portion a fluid pressure sufficiently high to rupture said blank when unrestrained between said pads, said increased volume being greater than that obtainable in the absence of the first expansion step.

6. In forming a hollow article from a blank of ductile metal by expanding an unjoined portion of said blank, the method comprising the steps of expanding the unjoined portion of the blank into firm engagement with spaced apart pads by injecting into said unjoined portion a fluid pressure sufficiently high to rupture said blank when unrestrained between said pads to form flat surfaces on the expanded unjoined portion of the blank through engagement of said outer surface with said pads, reducing said pressure below the level sufficient to rupture said blank when unrestrained between said pads, spacing such pads farther apart, and increasing the volume of the expanded unjoined portion by again injecting into said unjoined portion a fluid under pressure sufficient for expanding said unjoined portion into firm engagement with said further spaced apart pads, said increased volume being greater than that obtainable in the absence of the first expansion step.

References Cited in the file of this patent
UNITED STATES PATENTS

| | | |
|---|---|---|
| 1,999,229 | Benedict | Apr. 30, 1935 |
| 2,344,743 | Smith | Mar. 21, 1944 |
| 2,498,275 | Johnson | Feb. 21, 1950 |
| 2,662,273 | Long | Dec. 15, 1953 |
| 2,735,390 | Engel | Feb. 21, 1956 |
| 2,857,659 | Staples | Oct. 28, 1958 |